United States Patent
Cirit et al.

(10) Patent No.: US 7,830,382 B2
(45) Date of Patent: Nov. 9, 2010

(54) METHOD AND APPARATUS FOR AUTOMATED GRAPHING OF TRENDS IN MASSIVE, REAL-WORLD DATABASES

(75) Inventors: Fahrettin Olcay Cirit, Saratoga, CA (US); Larry Steven Peranich, San Diego, CA (US); Helen Geraldine Eugenio Rosario, Austin, TX (US)

(73) Assignee: Fair Isaac Corporation, Minneapolis, MN (US)

( * ) Notice: Subject to any disclaimer, the term of this patent is extended or adjusted under 35 U.S.C. 154(b) by 1022 days.

(21) Appl. No.: 11/562,952

(22) Filed: Nov. 22, 2006

(65) Prior Publication Data

US 2008/0117213 A1    May 22, 2008

(51) Int. Cl.
  *G06T 11/20* (2006.01)
  *G06F 17/30* (2006.01)
(52) U.S. Cl. .......................... 345/440; 705/10
(58) Field of Classification Search ................ 345/440; 705/10
See application file for complete search history.

(56) References Cited

U.S. PATENT DOCUMENTS

| | | | | |
|---|---|---|---|---|
| 5,893,072 A | * | 4/1999 | Zizzamia | 705/4 |
| 5,995,957 A | * | 11/1999 | Beavin et al. | 707/2 |
| 7,595,801 B1 | * | 9/2009 | Cherkas | 345/440 |
| 2004/0183800 A1 | * | 9/2004 | Peterson | 345/440 |
| 2005/0234761 A1 | * | 10/2005 | Pinto et al. | 705/10 |
| 2006/0085234 A1 | * | 4/2006 | Cagan | 705/7 |
| 2006/0161403 A1 | * | 7/2006 | Jiang et al. | 703/2 |
| 2007/0027637 A1 | * | 2/2007 | Delenstarr et al. | 702/23 |
| 2007/0076001 A1 | * | 4/2007 | Brand | 345/440 |
| 2007/0240066 A1 | * | 10/2007 | Bissantz | 715/760 |

OTHER PUBLICATIONS

David. R. Turner; "Error Detection and Principle Components Analysis on a Large Semiconductor Data Set"; Portland State University; May 2001.
Edward Tufte; "Sparklines: Theory and Practice"; May 27, 2004.

* cited by examiner

*Primary Examiner*—Xiao M Wu
*Assistant Examiner*—David T Welch
(74) *Attorney, Agent, or Firm*—Mintz, Levin, Cohn, Ferris, Glovsky and Popeo, P.C.

(57) ABSTRACT

A method and apparatus for leveraging the inherent massiveness of real-world data sets to solve the problems typically associated with graphing the data is provided. Three particular areas of concern are as follows: a high likelihood of containing instances of bad or corrupted data that could distort the graph; little or no documentation about the type of each variable; and the presence of arbitrarily encoded missing or special values. One embodiment of the invention provides a methodology for automatically selecting a graphing range with minimal scale distortion. Another embodiment of the invention provides a methodology for automatically choosing an appropriate graphing style. Another embodiment of the invention provides a methodology for automatically detecting and filtering special values in data.

26 Claims, 3 Drawing Sheets

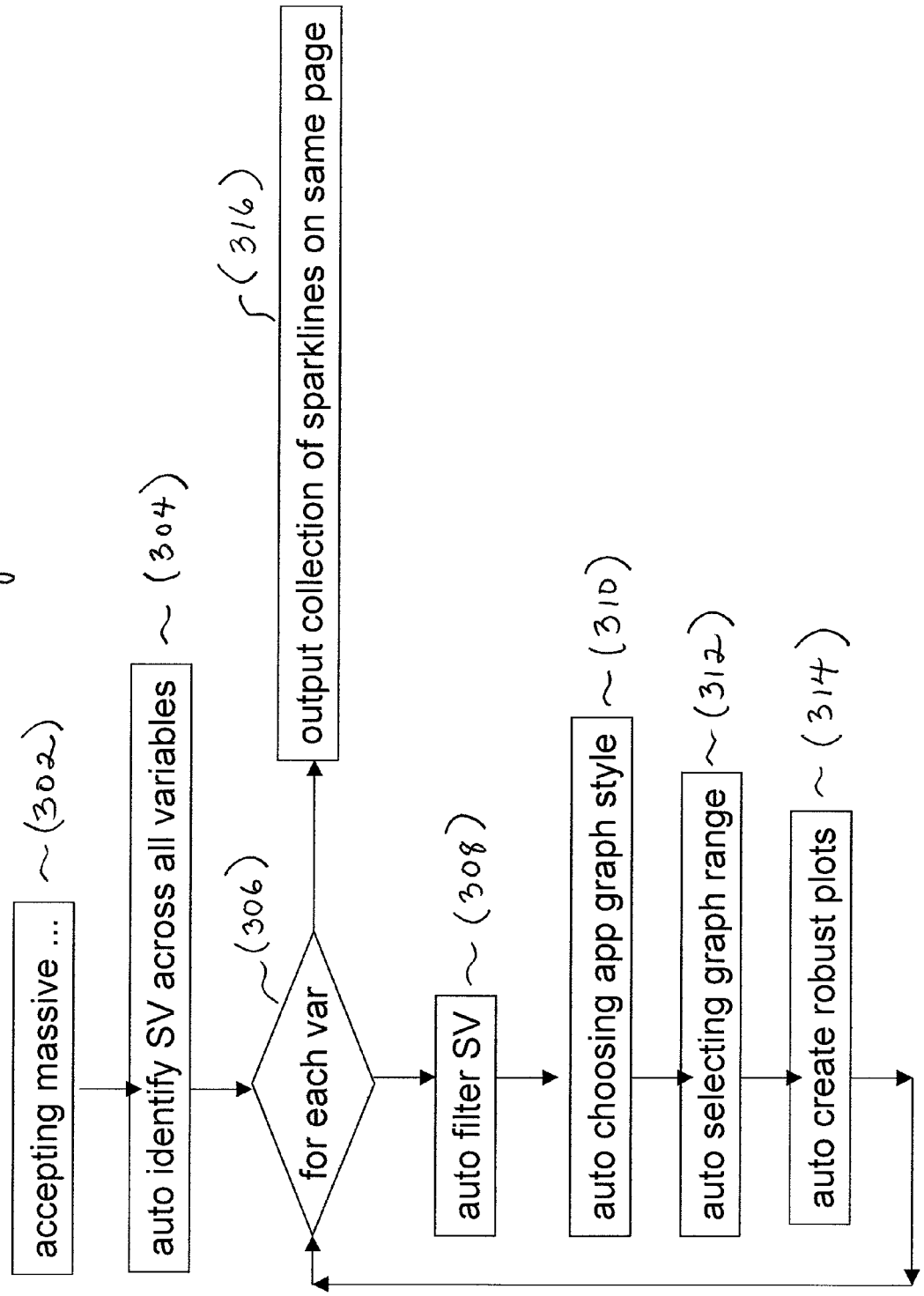

METHOD AND APPARATUS FOR AUTOMATED GRAPHING OF TRENDS IN MASSIVE, REAL-WORLD DATABASES

BACKGROUND OF THE INVENTION

1. Technical Field

The invention relates generally to graphing tools for the computer. More particularly, the invention relates to a system and method for automated graphing of trends using massive datasets.

2. Description of the Prior Art

Off-the-shelf graphing tools can be suboptimal for use by analysts dealing with real-world datasets. Real-world datasets often contain a large number of records and a large number of variables per record.

In order to produce a sensible, aesthetically pleasing graph for every variable in a dataset with an off-the-shelf graphing tool, an analyst must typically adjust and audit each graph by hand, a task that quickly becomes intractable as the size of the dataset increases.

Real-world datasets often present one or more of the following problems that typically frustrate regular graphing tools:

A high likelihood of containing instances of bad or corrupted data that could distort the graph;

Little or no documentation about the type of each variable, such as continuous, categorical, or mixed; and The presence of arbitrarily encoded missing or special values.

David R. Turner in *Error Detection and Principle Components Analysis on a Large Semiconductor Data Set* (May 2001), a manuscript received to satisfy course requirements, which work was supported by LSI Logic Corporation through a grant to Portland State University, discusses an outlier detection methodology, the Histc method, geared toward large datasets, in the context of 5 to 95 percentile filtering and outlier detection through dual variance. Turner found that given data with a large concentration of outliers at a given value, the Histc filtering preserved 62.9% of data with one replacement while the 5% to 95% filtering process preserved 13.7% of data with one replacement. Turner also discussed that one can derive and apply meta-parameters to simplify other analyses such as time series trend detection because it is believed that some of the principle components will probably be more sensitive to certain types of changes in the process.

Edward Tufte, from a few pages from the 18-page chapter on Sparklines in Beautiful Evidence (2006), http://www.edwardtufte.com/bboard/q-and-a-fetch-msg?msg_id=0001OR&topic_id=1 discusses sparklines, as simple, word-sized graphics and as a way to capture one or more values in context.

However, Tufte is completely silent on the problems introduced hereinabove, namely, a high likelihood of containing instances of bad or corrupted data that could distort the graph; little or no documentation about the type of each variable; and the presence of arbitrarily encoded missing or special values. Turner is completely silent on little or no documentation about the type of each variable and the presence of arbitrarily encoded missing or special values.

It would be advantageous to provide a method and apparatus that solves any of or any combination of the problems disclosed hereinabove.

SUMMARY OF THE INVENTION

A method and apparatus for leveraging the inherent massiveness of real-world datasets to solve the problems typically associated with graphing and understanding the data is provided. Three particular areas of concern are as follows: a high likelihood of containing instances of bad or corrupted data that could distort the graphs; little or no documentation about the type of each variable; and the presence of arbitrarily encoded missing or special values. One embodiment of the invention provides a methodology for automatically selecting a graphing range with minimal scale distortion. Another embodiment of the invention provides a methodology for automatically choosing an appropriate graphing style. Another embodiment of the invention provides a methodology for automatically detecting and filtering special values in data.

BRIEF DESCRIPTION OF THE DRAWINGS

FIG. 3 is a flow diagram of a computer-implemented process flow for automatically graphing the data from a massive data set according to the invention.

DETAILED DESCRIPTION OF THE INVENTION

A method and apparatus for leveraging the inherent massiveness of real-world datasets to solve the problems typically associated with graphing and understanding the data is provided. Three particular areas of concern are as follows: a high likelihood of containing instances of bad or corrupted data that could distort the graphs; little or no documentation about the type of each variable; and the presence of arbitrarily encoded missing or special values. One embodiment of the invention provides a methodology for automatically selecting a graphing range with minimal scale distortion. Another embodiment of the invention provides a methodology for automatically choosing an appropriate graphing style. Another embodiment of the invention provides a methodology for automatically detecting and filtering special values in data. Another embodiment of the invention provides a methodology for automatically creating more robust plots for continuous or binary Y-axis variable and for any type of X-axis variable.

Graphs are typically used to understand the relationship between two or more variables. As an example, consider a data set that contains variables gleaned from loan applications filed at a bank. Corresponding to each application, the data set also contains a variable specifying whether or not the person receiving the loan paid off the entire load, i.e. a binary variable, paid all and did not pay all. Assume also that the loan application contains a question which asks for the age of the applicant. An analyst may desire to understand the relationship between the age of the applicant and the probability that the loan will not be paid off. The analyst could construct a graph with the age on the X-axis (abscissa) and a function of the probability of paying off the loan on the Y-axis (ordinate), and a curve drawn on the graph showing the relationship between these two variables. In this case, the age variable can be a continuous variable between 18 years, i.e. the minimum age to apply for a loan, and, as an example, 55 years, while the Y-axis of the graph is the estimated probability of one of the two binary outcomes, e.g. paid off the loan.

Figure 1:
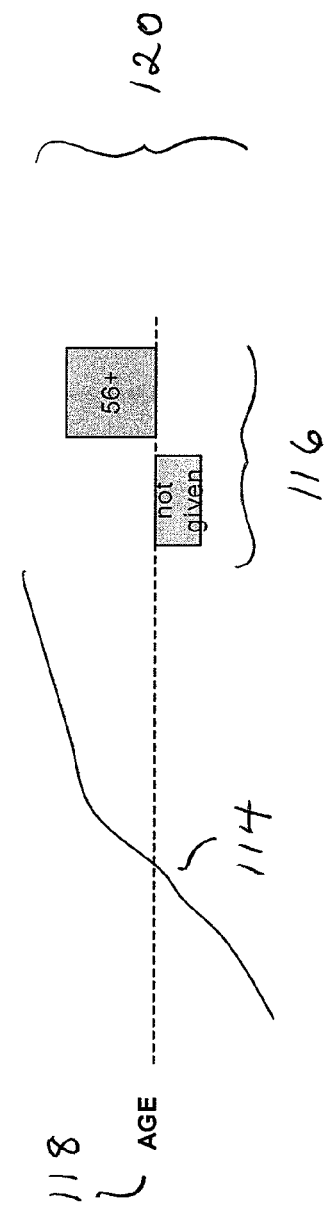
FIG. 1 is a schematic diagram showing the difference between a tradition plot according to the prior art and a sparkline plot displaying the same information according to the invention.
Figure 1:
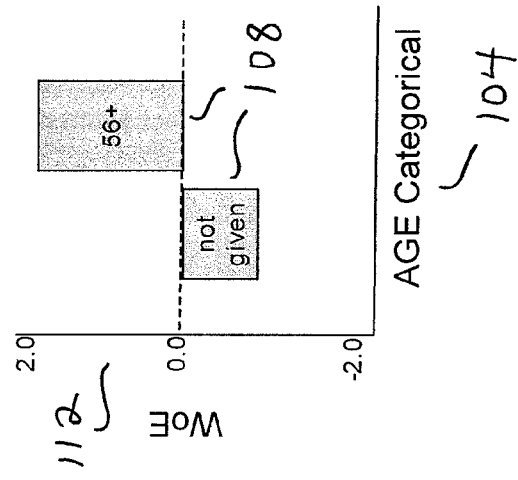
Figure 1:
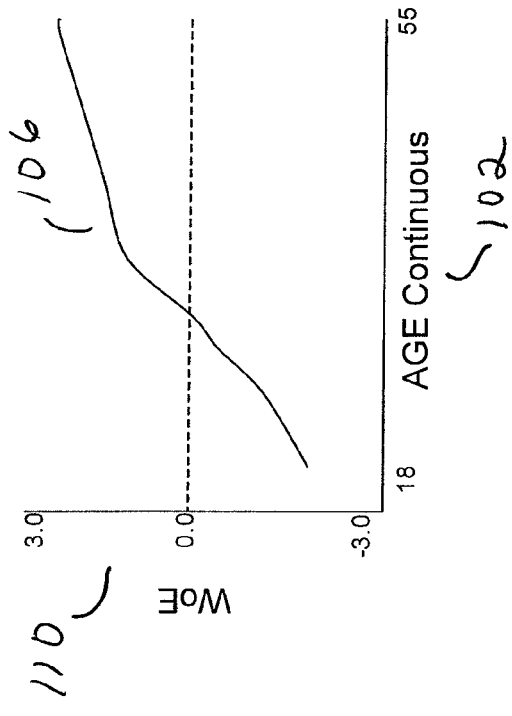

Referring to FIG. 1, there is shown a schematic diagram of a Traditional Plot, according to the prior art and a Sparkline. Representation plot, according to the invention. The Traditional Plot represents a plot typically produced by common plotting software such as Excel. For a mixed variable, typically the user, such as the analyst in our example, has to split the variable into its continuous values 102 and categorical values 104, and then produce separate plots for the continuous portion 106 and categorical portion 108. These separate plots typically are on different Y-axis scales, such as (−3,0 to 3.0) 110 for the continuous values and (−2.0 to 2.0) 112 for the categorical values of FIG. 1. That is, unless the scales are manually normalized by the user.

In contrast and according to one embodiment of the invention, the WOE Sparkline puts the continuous portion of a variable 114 and the categorical portion of the variable 116 on the same Y-axis scale 118 and on the same plot 120, making for an efficient plot design and allowing for quicker and easier interpretation. It should be appreciated that the technique of putting both the line plots for continuous values and the bar charts for categorical values on the same Sparkline plot was not addressed in Tufte as Tufte did not address plotting mixed variables using Sparklines.

It should be appreciated that to help interpret the plot, a positive WOE denotes a high probability the loan will be paid in full; a negative WOE denotes a low probability of full payment; while WOE=0 denotes the population average probability of full payment. Hence FIG. 1 indicates that the older the loan applicant, the higher is the probability the loan will be paid in full.

Another example where the variable associated with the X-axis is categorical is the answer to a question on the loan application asking highest level of education, with checkboxes for: did not graduate from high school, graduated from high school, some college, undergraduate degree, and graduate degree. The analyst might ask for a bar-graph, with one bar for each educational category, and the height of each bar showing the probability that the loan will be paid in full.

Real-world data frequently contain variables that are mixtures of continuous and categorical values. For example, regulatory constraints aimed a preventing discrimination against the elderly may prevent the bank from asking for the exact age of anyone above 55 years in age. Therefore, the age variable may contain a continuous range of values from 18 to 55, and a "special value" that indicates the person is over 55. There might be an additional special value that indicates that the person declined to answer the age question at all. The manner in which these special values are encoded may vary from computer system to computer system, but representing them as large negative numbers is common. The analyst studying this data would want the ages from 18 to 55 treated as continuous values, but would also want the special values treated as categorical values. Unfortunately, most commercially available graphing software packages do not gracefully deal with mixed variables.

When the variable corresponding to the Y-axis of the graph is a binary variable, i.e. takes on only two values, there are a number of options for what type of number to plot on the Y-axis of the graph. The examples above plot the probability of the "good" outcome, i.e. did pay the loan, or the Weight of Evidence (WoE). In the more general case, assume the binary variable takes on values A and B, and the variable on the X-axis is named x. The analyst may want to see any of the following plotted on the Y-axis:

1. the probability of value A as a function of x, p(A|x),
2. the probability of value B as a function of x, p(B|x),
3. the odds as a function of x, p(A|x)/p(B|x),
4. the logarithmic odds as a function of x, log(p(A|x)/p(B|x)),
5. the Weight of Evidence as a function of x, log(p(A|x)/p(B|x))−log(p(A)/p(B)), where p(A) is the probability of value A on the entire data set and p(B) is the probability of value B on the entire data set,
6. any other reasonable function of p(A|x), p(B|x), p(A) and p(B).

The Weight of Evidence (WoE) is frequently desired because a positive WoE indicates that p(A|x) is greater than p(A) and p(B|x) is less than p(B), while a negative WoE indicates that p(A|x) is less than p(A) and p(B|x) is greater than p(B).

It should be appreciated to one of ordinary skill in the art that the use of any one term in the list p(A|x), p(B|x), odds, logarithmic odds, or Weight of Evidence in the remainder of this document is not meant to be limiting, but is meant to be by way of example only.

The variable corresponding to the Y-axis does not need to be a binary variable. Another common case is where this variable is a continuous variable. Extending the example above, the data set may also contain a variable that shows the percentage of the loan that was paid off, with this value varying continuously from 0% to 100%. In this case, the value plotted on the Y-axis could be, for example, the mean or average value of this percentage as a function of the variable on the X-axis or the normalized mean value of this percentage as a function of the variable on the X-axis. The normalized mean value of this percentage as a function of the variable on the X-axis is computed by subtracting the average value of this percentage computed on the entire data set from the mean value of this percentage as a function of the variable on the X-axis. The advantage of the normalized mean value as a function of the variable on the X-axis is that when the normalized mean is positive it indicates that a larger than average percentage of the loans were paid off, and when the normalized mean is negative it indicates that a smaller than average percentage of the loans were paid off.

It should be appreciated to one of ordinary skill in the art that the use of mean or normalized mean herein this document is not meant to be limiting, but is meant to be by way of example only.

Methodology for Automatically Selecting a Graphing Range with Minimal Scale Distortion.

One embodiment of the invention provides a mechanism for automatically selecting a graphing range with minimal scale distortion. Such mechanism provides a solution to the problem of a high likelihood of real-world datasets containing instances of bad or corrupted data that could distort the graph.

As background, it has been found that as the size of a real-world dataset increases, the minimum and maximum values of each variable tend to become increasingly distant from the bulk of the observed data. Sometimes in such cases the minimum and maximum values represent instances of bad data that need to be filtered out. A graphing system that attempts to graph such data on a linear scale from the minimum to the maximum can distort trends in the data. For one reason, the user does not typically expect to see trends graphed over such a large range where the bulk of the data lies within a much smaller range. In other words, the graph can become unrecognizably stretched. To compensate for this distortion, users of such systems must adjust the graphing range by hand in order to arrive at a sensible graph. It has been found that other graphing systems may graph data over a quantile normalized scale, the definition of which is described hereinbelow, such that, for example, the X-axis is on a percentile scale from 0 to 100. Such an approach avoids stretching the graph, but distorts trends in the graph because a percentile mapping is always non-linear for real-world, non-uniformly distributed data. It may be impossible to know the true shape of a trend in the graph under such a scheme without also knowing the underlying distribution of the data.

A quantile is a value, such that a certain fraction of the values of a variable are less than the quantile. For example, the 30th percentile, where percentiles are a type of quantile based on percentages of variable x, is the value p30 such that 30 percent of the values taken on by x fall below p30. As an example of a quantile normalized scale, imagine that variable x takes on values between 0 and 1, with most of the values around 0. In other words, there are many more values below x=0.5 than above x=0.5. Suppose it is desired to plot another variable y vs. x. With a quantile normalized scale, the plotter is going to introduce a non-linear scaling for the x values, i.e. X-axis. Suppose the plotter wants to plot a point with y=0.3 and x=0.5, and the x-axis is the horizontal axis. Instead of putting this point half way between the 0 and 1 on the x-axis, as with linear scaling, the plotter needs to ask what fraction of the values of x fall below 0.5. If such value is 80 percent of the values, the point is plotted 80 percent of the way from 0 to 1 on the x-axis. For this example, such technique tends to stretch out the graph horizontally for low values of x, where there are more values, and compress the graph horizontally for high values of x, where there are fewer values.

According to one embodiment of the invention, a solution to such problem described above is to graph data from a starting quantile to an ending quantile on a linear scale, determined independently of intervening quantiles. For example, the graph can range from the first to the ninety-ninth percentile, as a default. Such a method is free of non-linear distortion and frees the user from the need to choose start and end ranges for the graph by hand, as the chosen range is typically very reasonable, and, assuming large datasets, is likely to be consistent across datasets for comparable variables.

Example Situations

The following describes example useful applications of this methodology and is not meant to be exhaustive.

When attempting to create a statistical model that predicts a binary outcome, such as fraud/non-fraud, bankrupt/not bankrupt, or will buy/won't buy, Fair Isaac analysts typically receive a large data set from a customer. The data set typically contains a variable, i.e. the target variable, which indicates the outcome for each record. For example, the record may be information on a single credit card transaction and the target variable indicates whether that transaction was fraudulent or not. Another example would be where the record is a credit bureau report for an individual and the target variable indicates whether or not that person went bankrupt.

The records in such data set may also contain many predictor variables. Predictor variables are variables that are known before the outcome is known and are used by a statistical model to try to predict the outcome so that Fair Isaac's customer can take action to prevent or reduce the seriousness of bad outcomes, e.g. lower the credit limit of someone who is likely to go bankrupt. Examples of predictor variables are: how many credit cards does this person have and how many of those credit cards show late payments in the last year, and so forth.

One of the first things an analyst wants to do is to understand which of the predictor variables are strong predictors of the outcome, i.e. the value of the target variable, and which of the predictor variables are very weak predictors of the outcome. A graph is an easy way to determine this relationship. For example, assume is it desirable to know how predictive is the utilization, which is the ratio of the balance to the credit limit. Utilization varies between zero and one plus a little bit, where utilization can be greater than one if the person has over-charged their card, raising their balance over their credit limit. One way to plot such is to look at all the records for which utilization is between 0 and 0.1, and then compute the fraction of those records for which the bad outcome, e.g. bankruptcy, occurred. Perform the same process for records between 0.1 and 0.2, records between 0.2 and 0.3, etc., up to records between 0.9 and 1.0, and then for records with utilization greater than 1.0. The analyst can then plot the fraction of bad outcomes as a function of the utilization, with utilization on a linear scale running from 0 to 1.2, for example. If the analyst sees that people with low utilization have low probabilities of going bankrupt and people with high utilizations have high probabilities of going bankrupt, or some other relationship where there are strong differences in the probability of the bad outcome as a function of the predictor, then the utilization variable is a strong predictor. On the other hand, if the analyst sees that the probability of going bankrupt does not vary much as the utilization varies, the utilization variable is not a strong predictor and the analyst may ignore it going forward.

In this example, the utilization variable is easy to plot because it is limited to between 0 and 1, plus a little bit, with the values spread out fairly evenly over that range. However, many other predictor variables are much harder to plot. For example, assume one of the predictors is the average spending per month on a credit card. For a substantial fraction of credit cards, such is zero because the card is not being used anymore. For most individuals, the amount may be between $100 per month and $1000 per month. However it is possible to have a few individuals who spend $10,000 per month, a very few account holders who spend $20,000 per month, and then perhaps, a foundation's credit card that gives $1,000,000 to some organization that is fighting HIV, as an example. If the analyst tries to plot the probability of a bad outcome verses the monthly spending on a linear scale that runs from the minimum monthly spending, i.e. zero, to the maximum monthly spending, e.g. a million dollars, the great majority of the credit cards are going to appear squished into the far left side of the plot because they are spending between 100 and 1000 dollars. The analyst cannot see the information presented by the graph on what may be the most important part of the data. What this aspect of this invention addresses is a way to limit the bounds of the graph so that the important part of the data are plotted large enough so that the analyst can see such data. If it is assumed that 99% of people spend less than $5000 per month and more than 1% spend nothing, then the graph's horizontal axis runs linearly from $0 per month, i.e. the first percentile, to $5000 per month. The foundation referred to above and others spending more than $5000 per month are not plotted at all. However, the loss of a few very unusual records, i.e. outliers, does not adversely affect the analyst's understanding.

It should be appreciated that one is not limited to plotting the probability of the bad outcome vs. the values of the predictor variable. Such plot is by way of example only. Other values, which can be derived from the probability, can also be plotted.

It should further be appreciated that several other issues may creep into the process of trying to construct the sparkline, such as:

Boundary Bias: As an estimator approaches the convex hull of the data, estimates become biased;

Runaway Extrema: As sample size increases, sample maximum and minimum are increasingly likely to be outliers; and Rogue Special Values: Non-standard special values show up as large, negative values.

To address and remedy such issues, it has been found that only values from the first to the ninety-ninth percentile are used.

Methodology for Automatically Choosing an Appropriate Graphing Style.

One embodiment of the invention provides a methodology for automatically choosing an appropriate graphing style. Such methodology provides a solution to the problem of a real-world dataset having little or no documentation about the type of each variable.

The graphs described in this methodology have an abscissa and an ordinate, also referred to, respectively, as the X— and Y-axes. The abscissa or X-axis corresponds to the variable that varies horizontally with the graph, while the ordinate or Y-axis corresponds to the variable that varies vertically with the graph. Depending on the nature of the variable associated with the X-axis, a graph may be of a categorical nature, of a continuous nature, or of a mixed nature in the abscissa, an explanation of which is described in detail hereinbelow. Depending on the nature of the variable associated with the Y-axis, a graph may depict either a function of the probabilities of the values of a categorical variable or a function of the summary statistics, such as the mean or standard deviation, of a continuous variable. In one embodiment of the invention, depending on the nature of the variable associated with the Y-axis, a graph may depict either a function of the probabilities of the two values of a binary categorical variable or a function of the mean of a continuous variable. This methodology produces a graph, i.e. a sparkline of the appropriate Y-axis function versus the values taken on by the predictor variable for each predictor variable in the data set, or some subset of the predictor variables specified by the user. Any one of such graphs can be the topic of discussion herein.

Mixed Nature in the Domain

Referring again to FIG. 1, a variable to be plotted along the X-axis may be categorical 104, continuous 102, or mixed in nature (114 and 116). A variable is mixed if it takes on both categorical values and continuous numeric values (114 and 116). For example, an income variable could take on any numeric value from zero to infinity, i.e. [0, infinity), as well as categorical special values such as "student," "unknown," "retired," etc. For mixed-type variables, the methodology plots the categorical values alongside the continuous values within the same graph. It should be appreciated that such plotting can also be implied in the third methodology discussion described hereinbelow in section, Methodology for automatically detecting and filtering special values in data.

One embodiment of the invention provides a solution to the problem of automatically choosing an appropriate graphing style, as follows. Because of the large size of real-world datasets, it is possible to infer the nature of each variable by examining the data. Specifically, an approximate or exact count of the number of distinct values seen in each variable is made, and because of the large size of the dataset, this count can be deemed an accurate representation of the source from which the data are sampled. For each variable, if the number of distinct values is less than or equal to the maximum number of categorical bars that can fit on a graph, or some fraction thereof, then the variable is graphed as categorical in the X-axis, otherwise, the variable is graphed as continuous in the X-axis. For the variable associated with the Y-axis, if the number of distinct values is exactly equal to two, then, for example, the logarithmic odds of that variable are graphed. In another example where the variable associated with the Y-axis takes on many values, the mean of the variable associated with the Y-axis is graphed.

Methodology for Automatically Detecting and Filtering Special Values in Data.

One embodiment of the invention provides a mechanism for automatically detecting and filtering special values in data. Such mechanism provides a solution to the problem of the presence of arbitrarily encoded missing or special values in real-world datasets.

As background, it has been found that many real-world datasets contain special values that appear to be numbers but have explicitly non-numeric interpretations. Different datasets may have different standards for encoding these non-numeric special values, but typically they are large negative numbers. Graphing systems typically cannot recognize these special values as such and attempt to graph them as numbers, which often introduces distortion into the graph.

Outlier detection is a technique that has been used with some success to address this problem. An example of a simple method for finding such special values using a standard outlier detection technique is the box plot with fences. That is, for a given variable on a dataset, define the quartiles $q1$ and $q2$. Define the interquartile range, $iq$, to be $q2-q1$. Choose as special values those values of the variable that are negative and less than the lower outer fence $q1-3iq$.

Negative outliers, however, are not always special values as they may simply be extreme cases of normal data. Furthermore, some variables may have so many instances of special values that no univariate outlier detection technique would be able to recognize the values as special, where it should be appreciated that herein., univariate refers to an analysis or statistic that is computed using only the values taken on by one variable. Examples of univariate statistics are average, minimum, and maximum. Here, for some variables, there may be so many special values that no automated technique that looks solely at the values taken on by the variable can identify the special values.

According to one embodiment of the invention, a solution to such problem is to compile lists of outliers for each variable on the dataset, then aggregate this list of outliers across variables to produce a global list of suspected special values for the dataset. A support threshold is imposed to ensure that only values that are outliers in a minimum percentage of variables are recognized as special values. As datasets typically use the same scheme to encode special values across all variables, a value that is an outlier across multiple variables is highly likely to be a special value. The automatically detected special values can then be treated as the categorical portion of a mixed type variable, and graphed separately as categorical non-numeric values alongside the continuous graph of non-special values. The large size of real-world datasets ensures the robustness of this approach. This mechanism is independent of the type of outlier detection used and as such can be used to find special values using any underlying outlier detection algorithm.

Method for Automatically Creating more Robust Plots for Continuous or Binary Y-axis Variable and for any Type of X-axis Variable.

This section can be viewed as an extension of second method described hereinabove, namely, Method for automatically choosing an appropriate graphing style.

When the Y-axis variable is a binary variable, i.e. it takes two possible values y1 and y2, Y is typically plotted as a function of the distributions of y1 and y2 across all X-axis values. Suppose this function is called F(Y) and as an example this function, F(Y), is the Weight of Evidence (WoE) as discussed hereinabove. If the variable on the X-axis is continuous or mixed, the values of the WoE are typically computed by dividing the range between the minimum and maximum values taken on by the X-axis variable into a number of bins, and computing the WoE for each bin based on the number of times y1 and y2 are detected in each bin. However, the computation of WoE, for example, can be sensitive to zero or low counts in any given X-axis bin. Given two data samples from the same population, low counts in one of the X-axis bins could produce widely different graphs between the two samples.

A typical approach to solving this problem is to group similar X-values into fewer bins, hence increasing the counts for each bin, and getting away from the zero or low counts problem. However, this approach is not robust as the resulting patterns are sensitive to how the X-axis values were binned and may produce inconsistent patterns across data samples.

According to one embodiment of the invention, a solution is to apply an appropriate smoothing function to F(Y). The choice of smoothing function depends on the nature of the X-axis variable, on the nature of the Y-axis variable, and on what F(Y) function is used. The use of a smoothing function eliminates the need to pre-process the X-axis variable, e.g. binning, and increases the consistency of the patterns produced from one sample data to another.

One example of smoothing is to use standard kernel density estimation techniques to produce a smoothed estimate of the probability of outcome y1 given a value of x, p(y1|x), and to produce a smoothed estimate of the probability of outcome y2 given a value of x, p(y2|x). These smoothed functions can be graphed directly, or used to compute smoothed functions for the logarithmic odds, WoE, or any other reasonable function of these probabilities.

It should be appreciated that the invention covers a wide range of smoothing functions and is not limited to any specific one and that the smoothing functions used hereinabove are by way of example only.

SUMMARY

Overall, the unique combination of these methods discussed above, and in no particular order, allows a data analyst to take a massive, real-world database and automatically graph the trends of hundreds of variables, where:
the X-axis variables can be categorical, continuous, or mixed in nature;
the Y-axis variable can be continuous or binary valued;
special values are automatically detected and filtered;
graphs of several variables are presented in a way that is easy to scan and quickly compare for predictive content; and
patterns produced are highly robust and consistent across data samples.

The automated nature of the tool allows the analyst to process a massive number of variables, producing massive numbers of graphs, with minimal parameter tuning. The effective presentation of the graphs allows the analyst to quickly analyze and interpret the data patterns.

An Exemplary Methodology for Automated Graphing of Trends in Massive, Real-world Databases WoE Sparklines This section provides an introduction to one or more embodiments of an exemplary Weight of Evidence (WoE) Sparklines tool and discusses the technology behind it. Discussed are targeted applications, use base, and proposed enhancements and changes.

This exemplary tool is intended to help analysts see trends in data and test drive different alternative target variables and weight variables before proceeding to modeling. This way, the analyst can understand the data rather than only depend on past experience and domain knowledge.

According to one embodiment of the invention, the way the tool presents trends in data is by creating Weight of Evidence graphs for all selected variables in the data stream.

Figure 2:
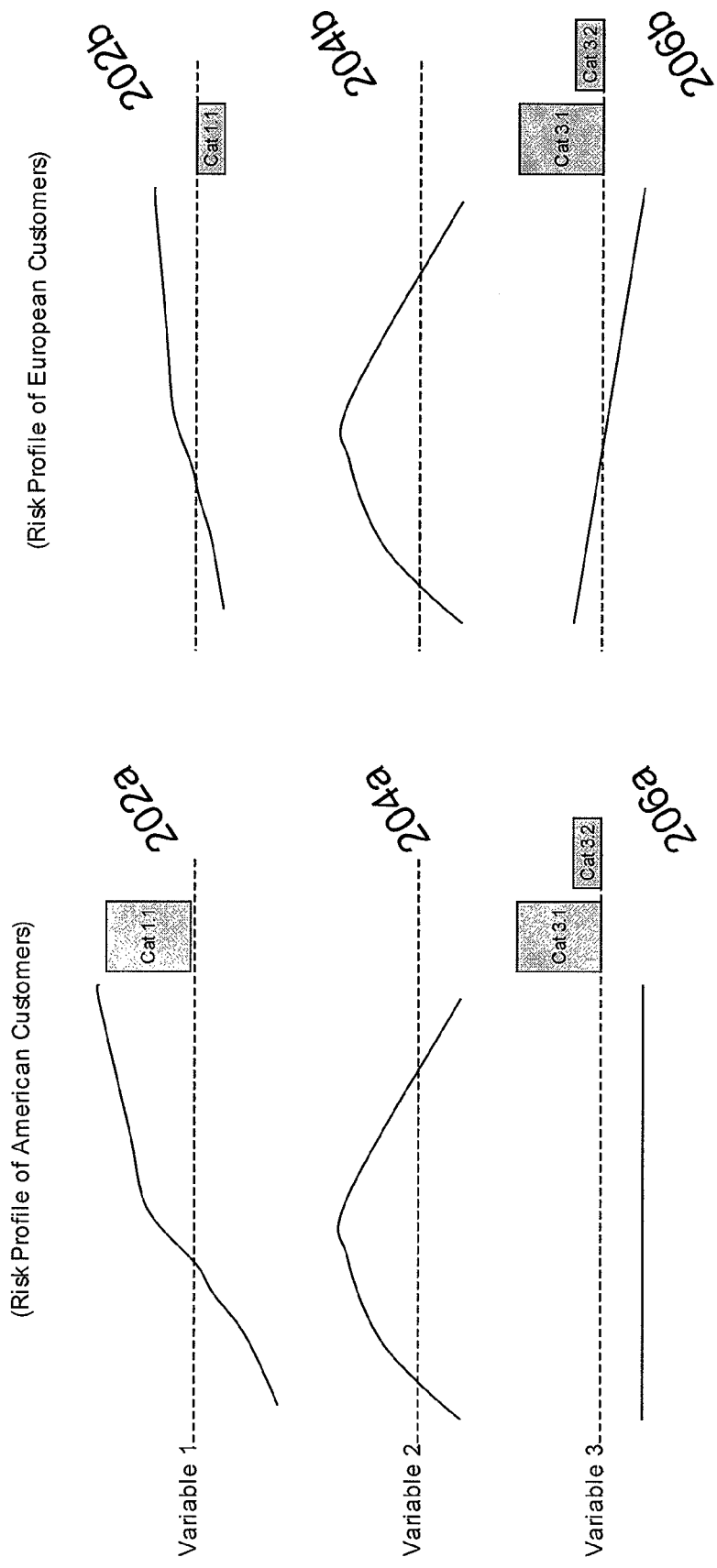
FIG. 2 is a schematic diagram showing exemplary sparkline plots for a risk profile of American customers and a risk profile of European customers according to the invention.

Referring now to FIG. 2, exemplary sparkline plots show the trend for three different variables, Variable 1 (202*a* & *b*), Variable 2 (204*a* & *b*), and Variable 3 (206*a* & *b*) from two different population segments. In this exemplary graph, that the Y-axis is Weight of Evidence (WoE), where high WoE indicates good risk and low WoE indicates bad risk.

Referring to the sparklines in the first column, i.e. Risk Profile of American Customers, it should be appreciated that these plots are produced, automatically, on the same Y-axes scale, making it very easy to compare the predictive patterns across variables. The sparkline of Variable 1 depicts a positive slope indicating that risk is improving as Variable 1 increases 202*a*. The sparkline of Variable 2 has the shape of a hill indicating that risk is worse at the extremes 204*a*. And, the sparkline of Variable 3, a mixed variable, is a straight line below the horizontal axis 206*a* for its continuous portion indicating that the risk is constant regardless of the value, while the categorical portion shows two special values above the horizontal axis indicating that risk is good for these two categories.

Referring to the sparklines in the first column, Risk Profile of American Customers, and the second column, Risk Profile of European Customers, it should be appreciated that the plots for all the population segments are automatically produced on the same scale. Being on the same scale, the differences in the risk profiles of American vs. European customers for the three variables can be quickly detected, such as depicted for Variable 1, i.e. 202*a* and 202*b*. For example, it is readily apparent that for Variable 2, there is no difference in profiles, i.e. 204*a* and 204*b*. It is further readily apparent that the continuous values of Variable 3 are predictive of the risk profile for European customers 206*b*, i.e. there is a non-zero slope, but not for American customers 206*a*, i.e. slope is zero.

FIG. 2 readily shows the advantage of having several sparkline plots displayed on the same page, that is, making it very easy to compare patterns across variables and population segments at a glance.

It should be appreciated that the WoE sparklines according to an embodiment of the invention:
uses the same scale across all variables and across all population segments for a given data set; and puts the continuous and categorical values of mixed variables on the same scale and on the same plot.

Other Embodiments

It should be appreciated that the number of embodiments of the invention are limitless. Hereinbelow are a few of suggested embodiments. These suggested embodiments are meant by way of example only and are not meant to be limiting:

One embodiment of the invention provides an interface design to ensure that configuration and execution of the tool continues to be intuitive and easy.

One embodiment of the invention supports Continuous Outcome target variables. Another embodiment of the WoE Sparklines supports Binary Outcome target variables.

One embodiment of the invention provides support for non-numeric variables of types Date, Strings and Chars. In another embodiment of the invention, the WoE Sparklines tool works only with numeric variables. Another embodiment of the invention contemplates working for other data types. For example, if a string array contains less than 20 unique values, such string can be treated as categorical variable on which the tool can be applied. As another example, date and time can be converted to epochs, i.e. sequential, non-overlapping time periods, and then treated as numeric variables.

Another embodiment of the invention provides the ability to use by-variables in constructing the graphs, where by-variables are categorical variables that effectively split a data set into several separate data sets based on the value of the particular by-variable. After the first pass of the data, the entire data set is split based by-variables and then sparklines are constructed for each data segment and the Y-axis variable is scaled the same across all data segments. An example of by-variable processing is shown in FIG. 2 and its accompanying text.

One embodiment of the invention graphs on a quantile scale. In another embodiment of the invention, the X-axis of the sparkline is treated as linear. Users may have an interest in seeing the X-axis defined as percentile values. One embodiment of the invention constructs the graph using percentile values for the X-axis. For example, the midpoint on the X-axis can correspond to the fiftieth percentile value.

One embodiment of the invention provides means for users to adjust for the influence of one or more variables. Users can be interested in seeing the WoE sparkline of a variable before and after adjusting for the effects of a given variable and one embodiment of the invention contemplates how the interactions are calculated and how the user can specify for which variable an adjustment is needed.

One embodiment of the invention provides an interactive interface. With an interactive interface, users can make adjustments to the sparkline and see the effect on the other variables, etc.

One embodiment of the invention provides logic that can be applied to order the plots and subdivide the plots into several pages in a way most relevant to the desired type of analysis, when there are too many sparkline plots to reasonably fit on a single page.

Use Cases and Intended Applications

Some embodiments of the invention can be applied to other applications as follows:

Testing Modeling Approaches;
Data Quality Assurance;
Graph 2D Interaction; and
Explore Approaches for Variable Interaction.

An Exemplary Sparkline Process Flow

One embodiment of a computer-implemented process flow for automatically graphing the data from a massive data set can be described with reference to FIG. 3. The process starts with accepting a massive data set as input (302) into a system on a computer network, where a massive data set contains many, many records and many, many variables per record. The system identifies all special values (SV) across all variables in the inputted massive data set (304). Then, for each variable in the massive data set (306), the system automatically detects and filters the SV (308), automatically chooses an appropriate graphing style (310), automatically selects a graphing range with minimal scale distortion (312), and automatically performs sub-processes for creating more robust plots for continuous or binary Y-axis variable and for any type of X-axis variable (314). The process continues at step (306) until there no variables remain. The system then outputs a collection of sparkline plots on a same page and on a same scale on the Y-axis (316). It should be appreciated that the collection of sparkline plots is not limited to being presented on one page, for example, if the sparkline plots do not reasonable fit on a single page.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A computer-implemented method for automated graphing of trends using a massive data set comprising a large plurality of records and a large plurality of predictor variables per record, the method being implemented by one or more data processors and comprising:

accepting, by at least one data processor, as input said massive data set comprising a large plurality of records and a large plurality of variables per record;

for each predictor variable from the massive data set, performing, by at least one data processor, the following:

automatically detecting and filtering special values;

automatically choosing an appropriate graphing style by determining the type of each variable by examining the data, the determination of the type of each variable by examining the data comprising:

calculating an approximate or exact number of distinct values detected in each variable, for each variable, if the number of distinct values is less than or equal to the maximum number of categorical bars that can fit on a graph, or some fraction thereof, then the variable is graphed as categorical in the X-axis, and otherwise, the variable is graphed as continuous in the X-axis, and for the variable associated with the Y-axis, if the number of distinct values is equal to two, then a function of any of the probabilities, p(A|x), p(B|x), p(A), and p(B), is graphed, and otherwise, the conditional mean of the variable associated with the Y-axis is graphed;

automatically selecting a graphing range with minimal scale distortion; and automatically performing sub-processes that create one or more robust plots for a continuous, or a binary, Y-axis variable, and for any type of predictor variable; and outputting, by at least one data processor, a collection of said one or more robust plots when no more predictor variables remain in said massive data set, thereby producing a graph of trends based on said massive data set.

2. The computer-implemented method of claim 1, wherein automatically selecting a graphing range with minimal scale distortion further comprises:

graphing, by at least one data processor, data from said data set from a starting quantile to an ending quantile on a linear scale, each quantile determined independently of other quantiles.

3. The computer-implemented method of claim 1, wherein automatically selecting a graphing range with minimal scale distortion further comprises:

graphing, by at least one data processor, data from said data set from a first percentile to a ninety-ninth percentile as a default range.

4. The computer-implemented method of claim 1, wherein automatically choosing an appropriate graphing style is applied to graphs for plotting relative differences.

5. The computer-implemented method of claim 1, further comprising:

for the variable associated with the Y-axis, if the number of distinct values is equal to two, then the conditional logarithmic odds minus the overall logarithmic odds of that variable is graphed and is referred to as the weight of evidence (WoE), and otherwise, the conditional mean minus the overall mean of the variable associated with the Y-axis is graphed.

6. The computer-implemented method of claim 1, wherein automatically detecting and filtering special values in data further comprises:

compiling, by at least one data processor, lists of outliers for each variable of the data set, then aggregating said list of outliers across variables, and producing a global list of suspected special values for the data set.

7. The computer-implemented method of claim 6, wherein a support threshold is applied to ensure that only values that are outliers in a minimum percentage of variables are recognized as special values.

8. The computer-implemented method of claim 7, further comprising:

filtering the automatically detected special values from the data stream and graphing them separately as categorical non-numeric values alongside the graph of non-special values.

9. The computer-implemented method of claim 7, wherein said detection of special values is independent of a type of outlier detection process.

10. The computer-implemented method of claim 1, wherein automatically creating one or more robust plots for continuous or binary Y-axis variable and for any type of X-axis variable further comprises:

applying an appropriate smoothing function to F(Y), where F(Y) is the function derived from the Y-axis variable being a binary variable, taking two possible values y1 and y2, and where F(Y) is plotted as a function of the distributions of y1 and y2 across all X-axis values.

11. The computer-implemented method of claim 10, where F(Y) is one of: the weight of evidence, the logarithmic odds, the probability of outcome y1, and the probability of outcome y2.

12. The computer-implemented method of claim 1, wherein automatically creating more robust plots for continuous or binary Y-axis variable and for any type of X-axis variable further comprises:

applying, by at least one data processor, an appropriate smoothing function to F(Y), where F(Y) is a function derived from the Y-axis variable being a continuous variable, taking a plurality of values, and where F(Y) is plotted across all X-axis values.

13. The computer-implemented method of claim 10, where F(Y) is one of: the mean of the Y-Axis variable and the normalized mean of the Y-Axis variable.

14. A computerized system on a computer network for automated graphing of trends using a massive data set comprising a large plurality of records and a large plurality of predictor variables per record, comprising:

means for accepting as input said massive data set comprising a large plurality of records and a large plurality of variables per record;

means for performing the following steps, for each predictor variable from the massive data set:

automatically detecting and filtering special values;

automatically choosing an appropriate graphing style by determining the type of each variable by examining the data, the determination of the type of each variable by examining the data comprising:

calculating an approximate or exact number of distinct values detected in each variable, for each variable, if the number of distinct values is less than or equal to the maximum number of categorical bars that can fit on a graph, or some fraction thereof, then the variable is graphed as categorical in the X-axis, and otherwise, the variable is graphed as continuous in the X-axis, and for the variable associated with the Y-axis, if the number of distinct values is equal to two, then a function of any of the probabilities, p(A|x), p(B|x), p(A), and p(B), is graphed, and otherwise, the conditional mean of the variable associated with the Y-axis is graphed;

automatically selecting a graphing range with minimal scale distortion; and automatically performing sub-processes that create one or more robust plots for a continuous, or a binary, Y-axis variable, and for any type of predictor variable; and means for outputting a collection of said one or more robust plots when no more predictor variables remain in said massive data set, thereby producing a graph of trends based on said massive data set.

15. The computerized system of claim 14, wherein the means for automatically selecting a graphing range with minimal scale distortion further comprises:

means for graphing data from said data set from a starting quantile to an ending quantile on a linear scale, each quantile determined independently of other quantiles.

16. The computerized system of claim 14, wherein the means for automatically selecting a graphing range with minimal scale distortion further comprises:

means for graphing data from said data set from a first percentile to a ninety-ninth percentile as a default range.

17. The computerized system of claim 14, wherein the means for automatically choosing an appropriate graphing style is applied to graphs for plotting relative differences.

18. The computerized system of claim 14, further comprising:

means for graphing the conditional logarithmic odds minus the overall logarithmic odds of a variable associated with the Y-axis, if the number of distinct values is equal to two, and referring to the graph as the weight of evidence (WoE), and otherwise, means for graphing the conditional mean minus the overall mean of the variable associated with the Y-axis.

19. The computerized system of claim 14, wherein the means for automatically detecting and filtering special values in data further comprises:
   means for compiling lists of outliers for each variable of the data set, then aggregating said list of outliers across variables, and producing a global list of suspected special values for the data set.

20. The computerized system of claim 19, wherein a support threshold is applied to ensure that only values that are outliers in a minimum percentage of variables are recognized as special values.

21. The computerized system of claim 19, further comprising:
   means for filtering the automatically detected special values from the data stream and means for graphing them separately as categorical non-numeric values alongside the graph of non-special values.

22. The computerized system of claim 20, wherein said detection of special values is independent of a type of outlier detection process.

23. The computerized system of claim 14, wherein the means for automatically creating one or more robust plots for continuous or binary Y-axis variable and for any type of X-axis variable further comprises:
   means for applying an appropriate smoothing function to $F(Y)$, where $F(Y)$ is the function derived from the Y-axis variable being a binary variable, taking two possible values $y1$ and $y2$, and where $F(Y)$ is plotted as a function of the distributions of $y1$ and $y2$ across all X-axis values.

24. The computerized system of claim 23, where $F(Y)$ is one of: the weight of evidence, the logarithmic odds, the probability of outcome $y1$, and the probability of outcome $y2$.

25. The computerized system of claim 14, wherein the means for automatically creating more robust plots for continuous or binary Y-axis variable and for any type of X-axis variable further comprises:
   means for applying an appropriate smoothing function to $F(Y)$, where $F(Y)$ is the function derived from the Y-axis variable being a continuous variable, taking a plurality of values, and where $F(Y)$ is plotted across all X-axis values.

26. The computerized system of claim 23, where $F(Y)$ is one of: the mean of the Y-Axis variable and the normalized mean of the Y-Axis variable.

* * * * *